United States Patent
Ikeda et al.

(10) Patent No.: US 9,970,785 B2
(45) Date of Patent: May 15, 2018

(54) IN-VEHICLE DETECTION DEVICE (71) Applicant: Hitachi Metals, Ltd., Tokyo (JP)

(72) Inventors: Yukio Ikeda, Hitachi (JP); Shinya Oeda, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days. days.

(21) Appl. No.: 15/301,376

(22) PCT Filed: Dec. 8, 2014

(86) PCT No.: PCT/JP2014/082381
§ 371 (c)(1),
(2) Date: Oct. 1, 2016

(87) PCT Pub. No.: WO2016/092607
PCT Pub. Date: Jun. 16, 2016

(65) Prior Publication Data
US 2017/0184418 A1    Jun. 29, 2017

(51) Int. Cl.
*G01D 5/14* (2006.01)
*B60R 16/02* (2006.01)
*F16C 41/00* (2006.01)

(52) U.S. Cl.
CPC ......... *G01D 5/145* (2013.01); *B60R 16/0215* (2013.01); *F16C 41/007* (2013.01); *F16C 2233/00* (2013.01); *F16C 2326/02* (2013.01)

(58) Field of Classification Search
CPC .............. G01P 1/026; G01P 3/42–3/60; G01D 5/12–5/2525; G01D 11/245; G01D 11/30;
(Continued)

(56) References Cited

U.S. PATENT DOCUMENTS 6,064,002 A * 5/2000 Hayami ................. H01B 7/295
   174/564
6,844,719 B2 * 1/2005 Tsuge ..................... G01P 1/026
   324/174

(Continued)

FOREIGN PATENT DOCUMENTS

JP    2003-329523 A    11/2003
JP    2004-204894 A     7/2004
(Continued)

OTHER PUBLICATIONS

International Search Report (ISR) (PCT Form PCT/ISA/210), in PCT/JP2014/082381, dated Feb. 24, 2015.
(Continued)

*Primary Examiner* — Huy Q Phan
*Assistant Examiner* — David Frederiksen
(74) *Attorney, Agent, or Firm* — McGinn IP Law Group, PLLC (57) ABSTRACT

An in-vehicle detection device includes a cable that includes a plurality of insulated electric wires that are formed by covering a central conductor with an insulator, and a sheath that collectively covers the insulated electric wires, a sensor that includes a sensor main body including a detection element, and a lead wire that is led from the sensor main body and connected to the central conductor, and a fixing member that includes a tubular portion to house the sensor and fixes the sensor and the cable to each other. The fixing member holds the insulated electric wires that are exposed from the sheath in a bent state thereof between an end of the sheath and the lead wire. A central axis of a part of the sheath that is held by the fixing member intersects with a central axis of the tubular portion at a predetermined angle.

15 Claims, 9 Drawing Sheets

(58) Field of Classification Search
CPC .............. B60R 16/0215; F16C 41/007; F16C 2233/00; F16C 2233/02
See application file for complete search history.

(56) References Cited

U.S. PATENT DOCUMENTS

| | | | |
|---|---|---|---|
| 6,868,744 B2 | 3/2005 | Sugimura et al. | |
| 6,988,422 B2 | 1/2006 | Sugimura et al. | |
| 7,155,984 B2* | 1/2007 | Fujita | G01D 11/245 |
| | | | 73/862.08 |
| 7,421,909 B2 | 9/2008 | Tsuge | |
| 8,941,374 B2* | 1/2015 | Takasaki | G01P 3/487 |
| | | | 324/207.11 |
| 2003/0167857 A1 | 9/2003 | Sugimura et al. | |
| 2004/0136628 A1 | 7/2004 | Inoue | |
| 2005/0126310 A1 | 6/2005 | Sugimura et al. | |
| 2005/0247139 A1 | 11/2005 | Sugimura et al. | |
| 2006/0260418 A1 | 11/2006 | Tsuge | |
| 2007/0253653 A1 | 11/2007 | Shigeoka et al. | |
| 2010/0104231 A1 | 4/2010 | Norimatsu | |
| 2010/0147549 A1* | 6/2010 | Shiina | H01B 7/295 |
| | | | 174/113 C |
| 2015/0040662 A1* | 2/2015 | Takasaki | G01P 1/006 |
| | | | 73/497 |
| 2016/0011011 A1* | 1/2016 | Takasaki | G01P 1/026 |
| | | | 324/207.2 |

FOREIGN PATENT DOCUMENTS

| | | |
|---|---|---|
| JP | 2006-112919 A | 4/2006 |
| JP | 2006-322875 A | 11/2006 |
| JP | 2008-240760 A | 10/2008 |

OTHER PUBLICATIONS

International Search Report (ISR) (PCT Form PCT/ISA/210), in PCT/JP2014/082381, dated Feb. 23, 2015.
Notification of Transmittal of Translation of the International Preliminary Report on Patentability (PCT/IB/338) in PCT Application No. PCT/JP2014/082381 dated Jun. 22, 2017 (and English translation of Written Opinion).
Chinese Office Action dated Nov. 23, 2017, with an English translation.

* cited by examiner

IN-VEHICLE DETECTION DEVICE

TECHNICAL FIELD

The invention relates to an in-vehicle detection device which is mounted on a vehicle and detects physical quantity about the vehicle.

BACKGROUND ART

Conventionally, as a detection device for vehicle, a torque detection device and a rotation detection device are known which the torque detection device detects torque which is applied to the detection device, and which the rotation detection device detects a rotational state of a wheel (see e.g., PTLs1, 2).

The torque detection device described in PTL1 is provided with an input shaft which links with a steering, an output shaft which links with a steering wheel, a torsion bar which couples the input shaft and the output shaft, a multipolar magnet, one pair of multipolar yokes, and a magnetic sensor. The torque detection device described in PTL1 is configured such that causes a relative rotation between the multipolar magnet and one pair of the multipolar yokes by torsion of the torsion bar caused by torque which is applied to the steering. One pair of magnetic flux collecting rings is disposed in circular on an outer peripheral side of the one pair of multipolar yokes. Each of the magnetic flux rings has a magnetic flux portion at one spot in a circumferential direction with projecting to a radial direction. The magnetic field sensor is disposed between the magnetic flux portion of one of the magnetic flux rings and the magnetic flux portion of the other magnetic flux ring.

In the torque detection device, when the multipolar magnet and one pair of the multipolar yokes rotate relatively, the magnetic field strength which is detected in the magnetic sensor changes corresponding to a relative rotational angle. Thus, the torque detection device can detect torque which is applied to the steering by the change in the magnetic field strength. The magnetic sensor is resin molded with one pair of the magnetic flux rings and lead wire (cable), and an output signal of the magnetic sensor is output via the lead wire.

Also, a vehicle rotation detection device described in PTL2 is provided with a Hall IC (Integrated Circuit) which detects the magnetic field strength, wire (cable) of which core wire is connected to IC lead wire led from the Hall IC, a resin member which fixes the Hall IC and wire each other. The Hall IC is disposed at nearby an axle and detects the magnetic field strength which changes corresponding to the rotation of the wheel.

In the vehicle rotation detection device, considering a problem that wire interferes the other parts mounted on a vehicle body or the vehicle (a vehicle member such as a suspension arm or a brake dust cover) if the wire is led from the resin member along an axial direction of the Hall IC, the wire is led from the resin member such that is perpendicular to an axis of the Hall IC. That is, wire curves in a circular angle at 90° in the resin member.

CITATION LIST

Patent Literature

PTL1: JP-A-2003-329523 ([0009], FIG. 5).
PTL2: JP-A-2006-322875 ([0006], [0042]).

SUMMARY OF INVENTION

Technical Problem

Meanwhile, along with the demand for downsized and lightened vehicles in recent years, each devices mounted on the vehicle is disposed densely. Also, the detection device is required to be improved in the installability onto the vehicle. Although the interference of the vehicle member with the wire can be prevented if the wire is bent in the resin member, e.g., as described in PTL2, the resin member must increase in size according to the bending radius if the wire is bent in the resin member.

Accordingly, it is an object of the invention to provide an in-vehicle detection device that allows the downsizing of the fixing member for fixing the sensor and the cable to each other to improve the installability onto the vehicle.

Solution to Problem

According to the invention, to solve the above problem, provided is an in-vehicle detection device, comprising:
  a cable that comprises a plurality of insulated electric wires that are formed by covering a central conductor with an insulator, and a sheath that collectively covers the plurality of insulated electric wires;
  a sensor that comprises a sensor main body comprising a detection element, and a lead wire that is led from the sensor main body and connected to the central conductor; and
  a fixing member that comprises a tubular portion to house the sensor and fixes the sensor and the cable to each other,
  wherein the fixing member holds the plurality of insulated electric wires that are exposed from the sheath in a bent state thereof between an end of the sheath and the lead wire, and
  wherein a central axis of a part of the sheath that is held by the fixing member intersects with a central axis of the tubular portion at a predetermined angle.

Advantageous Effects of Invention

According to the invention, the in-vehicle detection device can be provided that allows the downsizing of the fixing member for fixing the sensor and the cable to each other to improve the mountability onto the vehicle.

DESCRIPTION OF EMBODIMENT

First Embodiments

Figure 1A:
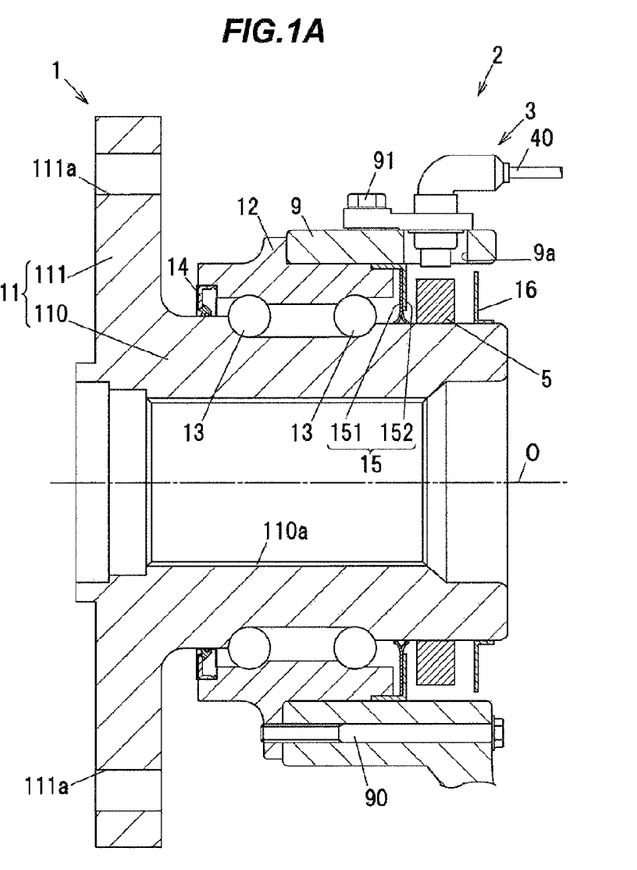
FIG. 1A is a cross sectional view showing a configuration example of a wheel bearing device according to a present embodiment and a sensor module.
Figure 1B:
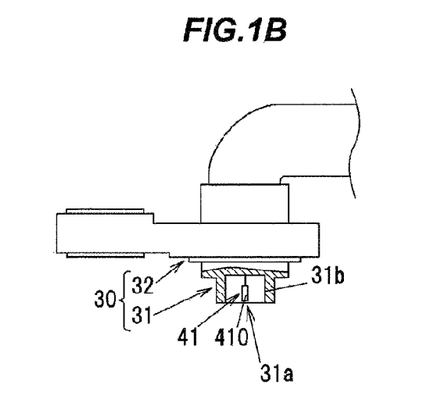
FIG. 1B is a partial enlarged view showing a sensor module.
Figure 1C:
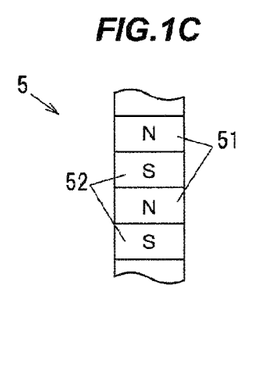
FIG. 1C is a plane view showing a configuration example of a magnetic encoder of a rotation detection device.

FIG. 1A is a full cross sectional view showing a wheel bearing device according to a first embodiment in the present invention. FIG. 1B is a block diagram showing a configuration example of a sensor module of the wheel bearing device. FIG. 1C is a plane view showing a magnetic encoder of the wheel bearing device.
(Configuration of Wheel Bearing Device 1)

A wheel bearing device 1 is provided with an inner ring 11 which includes a cylindrical main body 110, and a flange 111 which fits a wheel, an outer ring 12 which is disposed at an outer peripheral side of the main body 110 of the inner ring 11, a plurality of rolling elements 13 which are disposed between the inner ring 11 and the outer ring 12, and a rotation detection device 2 to detect a rotational speed of the inner ring 11 relative to the outer ring 12. The rotation detection device 2 is one embodiment of the in-vehicle detection device according to the present invention.

A spline joint 110a to link a drive shaft along a rotational axis O of the main body 110 is formed at a central portion of the main body 110 of the inner ring 11. The flange 111 of the inner ring 11 is formed with the main body 110 integrally with the flange 111 projecting to radially outside of the main body 110. A plurality of through holes 111a in which a bolt to assemble the not shown wheel is press-fitted are formed in the flange 111.

The outer ring 12 is formed cylindrically, and fixed to a knuckle 9 which is coupled to a vehicle body via suspension by a plurality of bolts 90 (FIG. 1A shows only one bolt). A through hole 9a to attach a sensor module 3 which will be described below is formed in the knuckle 9.

A circular space between the inner ring 11 and the outer ring 12 is sealed by the first sealing member 14 and the second sealing member 15. The first sealing member 14 is disposed at an flange 111 side of the inner ring 11, the second sealing member 15 is disposed at the opposite side (an vehicle body side). The second sealing member 15 is provided with a core metal 151 whose cross-section is L-shape, and an elastic member 152 which is adhered to the core metal 151 by cure adhesion. A cylindrical portion which is formed at an outer periphery of the core metal 151 is pressed in an outer peripheral surface of the outer ring 12.

The rotation detection device 2 is provided with a sensor module 3 which is disposed opposite a magnetic encoder 5 which is fixed on an outer periphery of the main body 110 in the inner ring 11, and a cable 40 of which an end is fixed to the sensor module 3. The magnetic encoder 5 is a tubular shape which is pressed in an outer peripheral surface of the main body 110 in the inner ring 11. As shown in FIG. 1C, the magnetic encoder 5 is provided with a plurality of the N-poles 51 and a plurality of the S-poles 52 which are disposed alternately along the circumferential direction. A cover member 16 to control extraneous material adhering to the magnetic encoder 5 is assembled on an outer peripheral surface of a vehicle body side end of the main body 110 in the inner ring 11.

The magnetic encoder 5 rotates with the inner ring 11, and magnetism of the magnetic pole (the N-pole 51 or the S-pole 52) changes in a position where is opposite to the sensor module 3 accompanying the rotation of the inner ring 11. The rotation detection device 2 detects a magnetism change of the magnetic encoder 5 in the position where the sensor module 3 opposites as the rotation of the wheel which is attached at the flange 111 of the inner ring 11 by the sensor module 3.

FIG. 1B shows the inside of a part of the sensor module 3 using a partial cross sectional view of the sensor module 3 shown in FIG. 1A. The sensor module 3 is provided with a magnetic field sensor 41, and a resin case 30 as a fixing member to fix the magnetic field sensor 41 and the cable 40 each other. The resin case 30 is provided with a housing case 31 which is made of resin to house the magnetic field sensor 41, and a molded body 32 which is made of mold resin that is molded with covering at least a part of the housing case 31.

The molded body 32 is molded with keeping the magnetic field sensor 41 in the housing case 31. The molding is operated by pouring heated molten resin into a die, and then solidifying the poured molten resin.
(Configuration of Sensor Module 3)

Figure 2A:
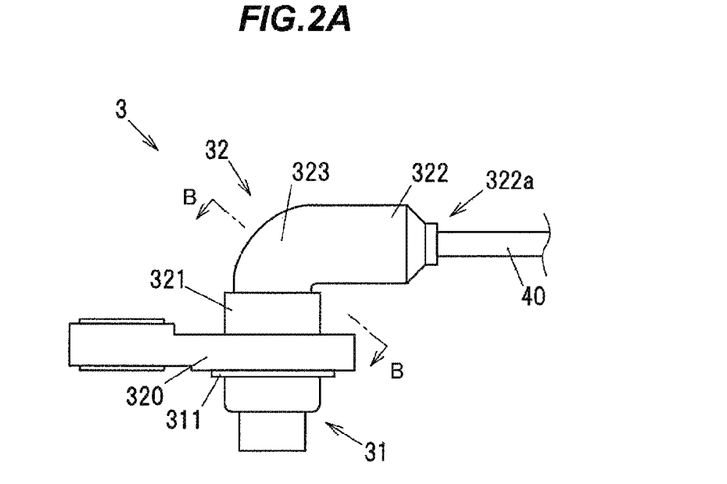
FIG. 2A is a front view showing a sensor module.
Figure 2B:
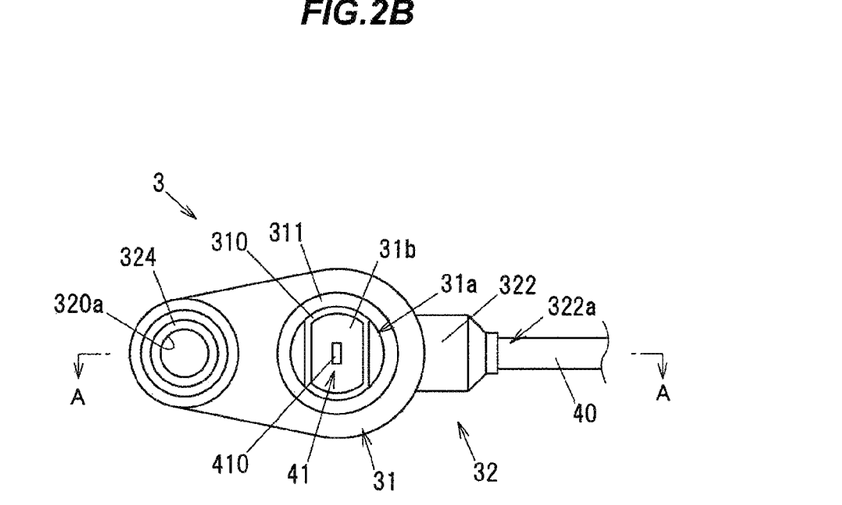
FIG. 2B is a top view showing the sensor module.
Figure 3:
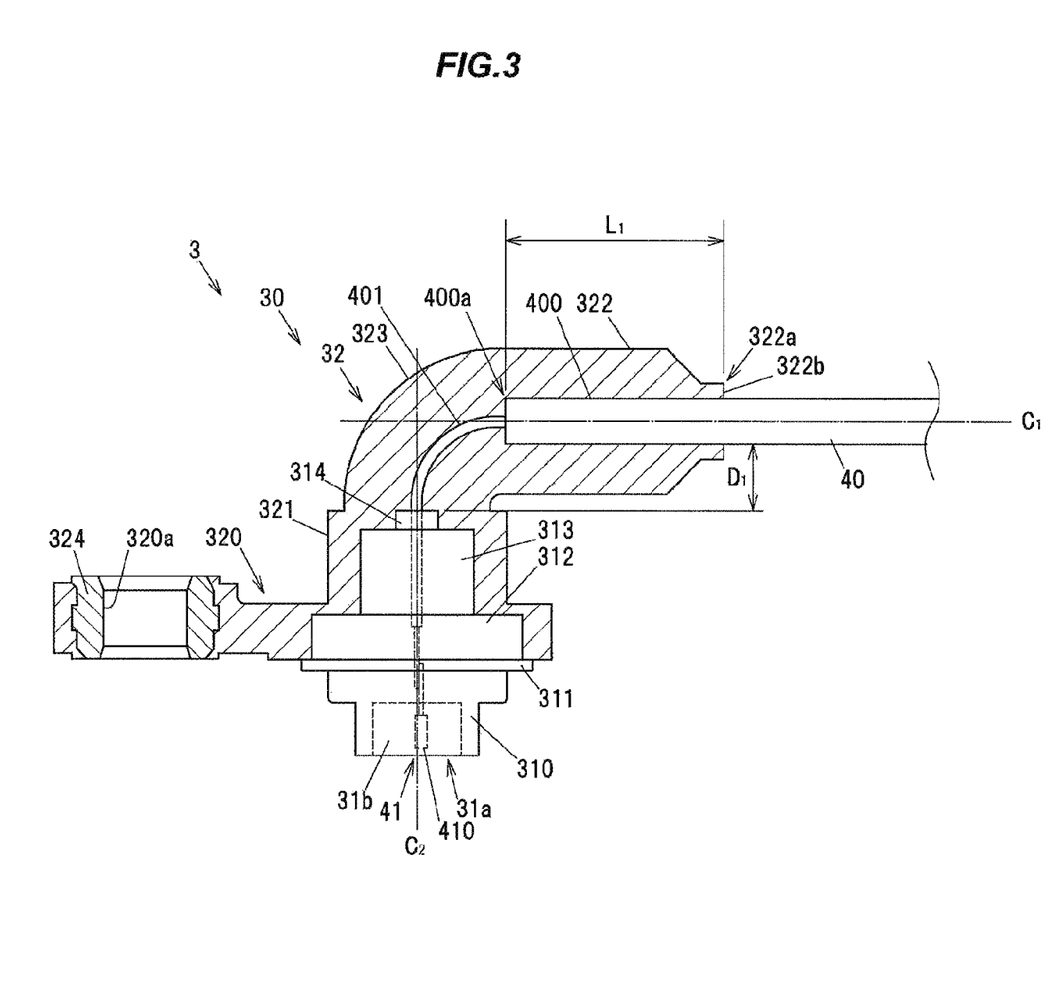
FIG. 3 is a cross sectional view along a line A-A in FIG. 2B.
Figure 4A:
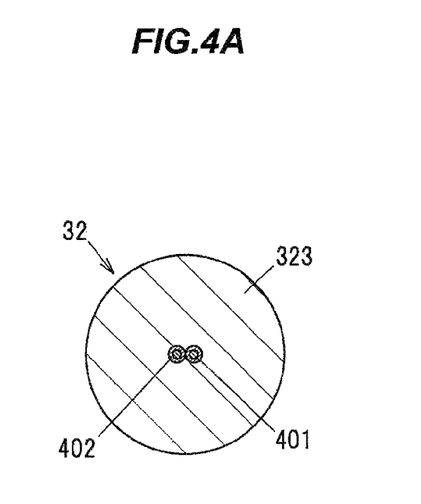
FIG. 4A is a cross sectional view along a line B-B in FIG. 2A.
Figure 4B:
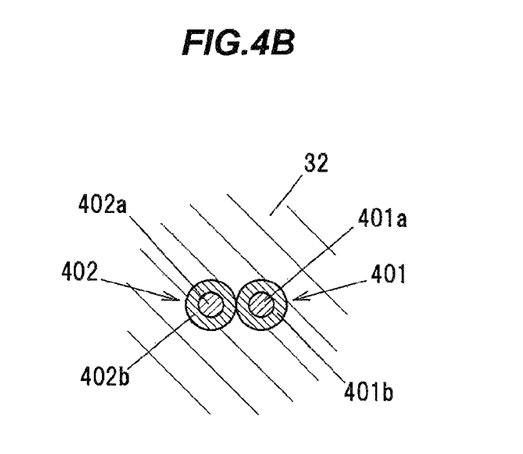
FIG. 4B is an enlarged view showing a main part in FIG. 4A.
Figure 5A:
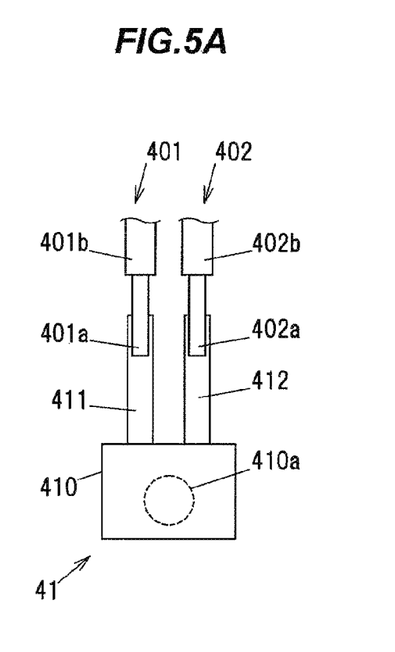
FIG. 5A is a plane view showing a magnetic field sensor and insulated electric wire.
Figure 5B:
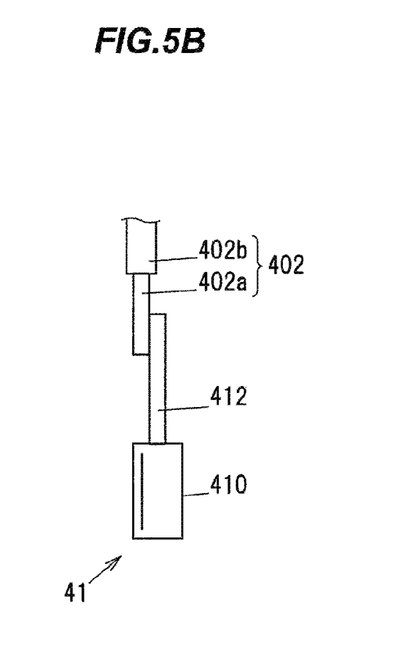
FIG. 5B is a side view showing the magnetic field sensor and the insulated electric wire.

Next, a configuration of the sensor module 3 will be explained accompanying FIGS. 2A to 5B. FIG. 2A is a front view showing the sensor module 3. FIG. 2B is a left side view showing the sensor module 3. FIG. 3 is a cross sectional view along a line A-A in FIG. 2B. FIG. 4A is a cross sectional view along a line B-B in FIG. 2A. FIG. 4B is an enlarged view showing a main part in FIG. 4A. FIG. 5A is a plane view showing the magnetic field sensor 41, and first and second insulated electric wires 401, 402. FIG. 5B is a side view showing them.

As shown in FIG. 3, the housing case 31 is provided with a tubular portion 310 of which an opening 31a such that the main body 410 of the magnetic field sensor 41 faces outwardly, a guard portion 311 which is formed so that the diameter of the guard portion 311 is larger than the diameter of the tubular section 310, and first to third held parts 312 to 314 which are held by the molded body 32. The first held part 312 is formed cylindrically such that the diameter of the first held part 312 is smaller than the diameter of the guard portion 311, and the second held part 313 is formed cylindrically such that the diameter of the second held part 313 is smaller than the diameter of the first held part 312. Also, the third held part 314 is cylindrical shape of which the diameter of the third held part 314 is smaller than the diameter of the second held part 313, and arranged at the farthest position from the guard portion 311. The main body 410 of the magnetic field sensor 41 is disposed in a housing space 31b which is formed in the tubular portion 310.

As shown in FIG. 2A, the molded body 32 exposes the tubular portion 310 of the housing case 31 and the guard portion 311 of the housing case 31 outwardly, and the molded body 32 is integrated with the housing case 31. The molded body 32 is provided with a flange 320 which is fixed to the knuckle 9 (shown in FIG. 1A), an extended portion 321 which is formed by extending to an opposite side from the tubular portion 310 of the housing case 31 along an axial direction of the inner ring 11 which is vertical to the rotational axis O (shown in FIG. 1A), a cylindrical portion 322 which extends in parallel to the rotational axis O with the central axis of the cylindrical portion 322 corresponding to a leading direction of the cable 40, and a cylindrical curving portion 323 which is curved circularly between the extended portion 321 and the cylindrical portion 322. The extended portion 321 covers the first to third held parts 312 to 314 of the housing case 31 (see FIG. 3). As shown in FIG. 4A, the first and second insulated electric wires 401, 402 are held in a central portion of the curving portion 323.

As shown in FIG. 2B, a bolt insert hole 320a is formed at one end of the flange 320 to insert the bolt 91. Also, a collar 324 which is made of metal such as aluminum is disposed in the flange 320. A central hole of the collar 324 is the bolt insert hole 320a.

The cable 40 is led from an end 322a of the cylindrical portion 322 in the molded body 32 parallel to the rotational axis O. As shown in FIGS. 3, 4A, the cable 40 is provided with a sheath 400, and the first and second insulated electric wires 401, 402 (FIG. 3 shows only the first insulated electric wire 401). The first and second insulated electric wires 401, 402 are covered with the sheath 400 at the cylindrical portion 322 in the molded body 32 integrally. For example, the sheath 400 is made of resin such as urethane. For example, the molded body 32 is made of PBT (poly butylene terephthalate) or nylon etc. Especially, if the material of the molded body 32 is, for example, nylon 66 or nylon 612, adhesion between the molded body 32 and the sheath 400 is extremely excellent.

As shown in FIG. 4B, the first insulated electric wire 401 is made by covering a central conductor 401a which is made of good electric conductive metal such as copper with an insulator 401b which is made of insulated resin. Likewise, as shown in FIG. 4B, the second insulated electric wire 402 is made by covering a central conductor 402a which is made of the good electric conductive metal such as copper with an insulator 402b which is made of the insulated resin.

The magnetic field sensor 41 is provided with a sensor main body 410 which includes a detection element 410a, and the first and second lead wires 411, 412 which are led from the sensor main body 410. The central conductor 401a of the first insulated electric wire 401 is connected to the first lead wire 411. And the central conductor 402b of the second insulated electric wire 402 is connected to the second lead wire 411. These connections can be operated by welding or soldering.

In the present embodiment, the detection element 410a of the magnetic field sensor 41 is a Hall element which detects the magnetic field by Hall Effect. The detection element 410a of the magnetic field sensor 41 is connected to the first and second lead wires 411, 412 in the sensor main body 410. The detection element 410a detects the magnetic field strength (the magnetic field of the magnetic encoder 5 at a tip end of the housing case 31 of the sensor module 3) which changes accompanying the rotation of the wheel.

As shown in FIG. 3, the resin case 30 holds the first and second insulated electric wires 401, 402 which are exposed from an end 400a of the sheath 400 in the molded body 32 with the first and second insulated electric wires 401, 402 bent between the sheath 400 and the first and second lead wires 411, 412 of the magnetic field sensor 41.

Also, the resin case 30 holds the sheath 400 linearly in the cylindrical portion 322. The sheath 400 is held by the cylindrical portion 322 over not less than 10 mm. In FIG. 3, the length of the sheath 400 which is held by the resin case 30 is shown by $L_1$.

A central axis $C_1$ of the sheath 400 which is held by the molded body 32 crosses a central axis $C_2$ of the tubular portion 310 of the housing case 31 at a predetermined angle by fixing the cable 40 with the first and second insulated electric wires 401, 402 bent.

In the present embodiment, each of the central axes $C_1$, $C_2$ crosses perpendicularly each other, and the first and second insulated electric wires 401, 402 curve in an arc-circular shape at 90° in the curving portion 323 in the molded body 32. However, it is not limited to thereof, the central axis $C_1$ of the sheath 400 which is held by the molded body 32 may cross the central axis $C_2$ of the tubular portion 310 of the housing case 31 at within 90°±10°. More preferable predetermined angle between the central axes $C_1$, $C_2$ is within 90°±5°.

The housing case 31 holds ends of the first and second insulated electric wires 401, 402 along the longitudinal direction of the first and second lead wires 411, 412 of the magnetic field sensor 41. The first and second insulated electric wires 401, 402 are led from the third held part 314 of the housing 31 to the outside of the housing case 31.

For example, an outer diameter of the sheath 400 is 5 mm, and each outer diameter of the first and second insulated electric wires 401, 402 is 1.5 mm. For example, each radius of curvature of the first and second insulated electric wires 401, 402 which is bent at the curving portion 323 of the molded body 32 is not less than 3.5 mm and not more than 10 mm. Also, distance $D_1$ between a leading portion 31c of the housing case 31 in a direction along the central axis $C_2$ and an outer peripheral surface of the sheath 400 of the cable 40 is, for example, not less than 3.5 mm and not more than 10 mm.

Comparative Example

Figure 6:
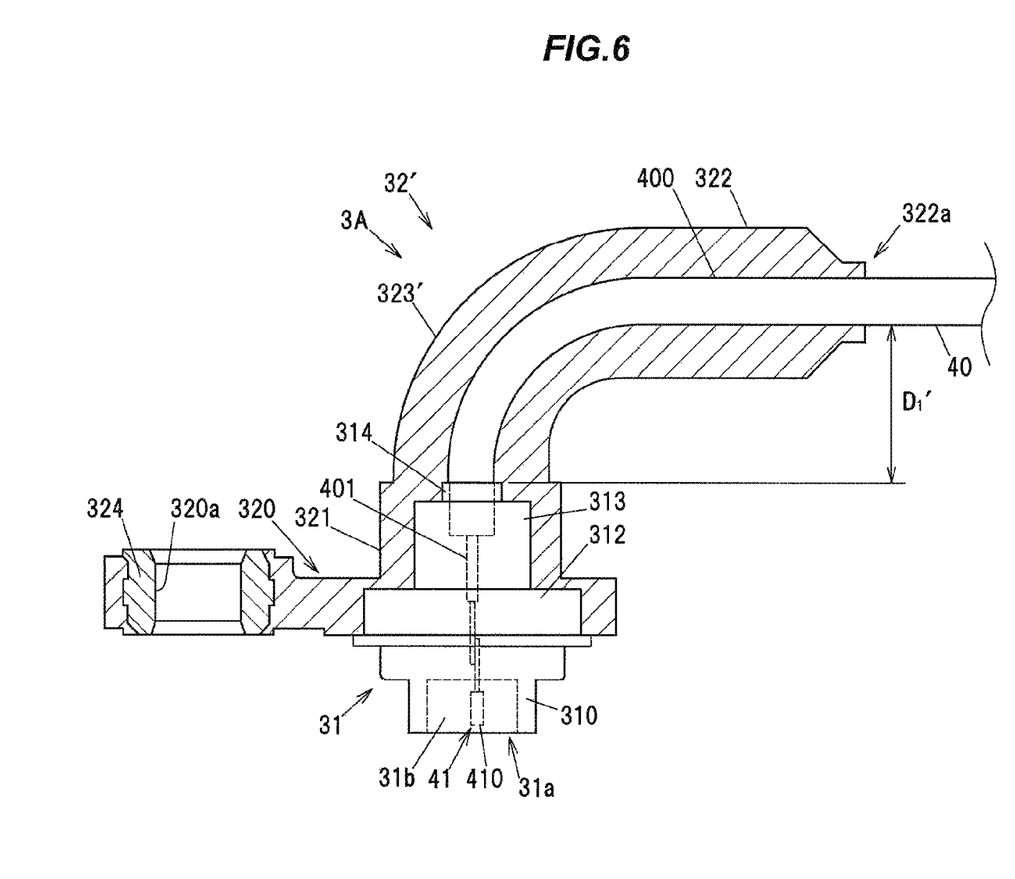
FIG. 6 is a cross sectional view showing a sensor module according to a comparative example 1 in a present embodiment.

FIG. 6 is a cross sectional view showing a sensor module 3A according to a comparative example 1. The sensor module 3A differs in a shape of the molded body 32' from a shape of the molded body 32 of the sensor module 3 according to the present embodiment, and is similar to the configuration of the sensor module 3 except housing an end of the sheath 400 of the cable 40 in the housing case 31, and led the sheath 400 from the third held part 314 of the housing case 31. In FIG. 6, the same reference numerals assigned in FIG. 3 are assigned to the elements in substantially commons with the sensor module 3 according to the present embodiment and the redundant description thereof is omitted.

Although the molded body 32' of the sensor module 3A is provided with a curving portion 323' corresponding to the curving portion 323 in the sensor module 3 according to the present embodiment, radius of curvature of the central axis of the curving portion 323' is formed larger than the radius of curvature of the central axis of the curving portion 323.

The difference between the radius of curvatures is caused by covering the first and second insulated electric wires 401, 402 by the sheath 400 of the cable 40 in the curving portion 323', and by bending the first and second insulated electric wires 401, 402 with the sheath 400. That is, since the sheath 400 has an outer diameter which is larger than the first and second insulated electric wires 401, 402 (FIG. 6 shows only the first insulated electric wire 401) and the hardness of the sheath 400 is higher than the hardness of the first and second insulated electric wires 401, 402, the sheath 400 is hard to bend. Thus, the curving portion 323' of the sensor module 3A cannot be formed as with the curving portion 323 in the present embodiment as well as the radius curvature and the molded body 32' becomes larger than the molded body 32 according to the present embodiment.

In the sensor module 3A, distance $D_1'$ between a leading portion 314 of the housing case 31 and an outer peripheral surface of the sheath 400 where the cylindrical portion 322 of the molded body 32' holds linearly is more than twice the distance $D_1$ in the sensor module 3 according to the present embodiment. Also, the radius of the curvature at bending portion of the sheath 400 in the curving portion 323' is more than twice the radius of curvatures of the first and second insulated electric wires 401, 402 in the curving portion 323 of the sensor module 3 according to the present embodiment.

Functions and Effects of the First Embodiment

The first embodiment as described above has the following functions and advantageous effects.
(1) In the cable 40, the central axis $C_1$ of the sheath 400 which is held by the molded body 32 crosses the central axis $C_2$ of the tubular portion 310 of the housing case 31 at a predetermined angle by bending the first and second insulated electric wires 401, 402 which are exposed from the end 400a of the sheath 400 in the molded body 32 (the curving portion 323). Hereby, the cable 40 led from the molded body 32 prevents the cable 40 from interfering with the other members mounted on vehicle, and the molded body 32 can be minimalized (minimalizing size in a direction vertical to the rotational axis O of the wheel bearing device 1). Thus, the installability of the wheel bearing device 1 onto the vehicle increases.
(2) The resin case 30 is a cylindrical shape which the curving portion 323 curves with holding the first and second insulated electric wires 401, 402 with the first and second insulated electric wires 401, 402 bent. And since the first and second insulated electric wires 401, 402 are held in the central portion of the curving portion 323, crystallization speed of the melted resin between an inner peripheral side portion inner than the first and second insulated electric wires 401, 402 in the curving portion 323 and an outer side peripheral portion outer than the first and second insulated electric wires 401, 402 in the curving portion 323 are equalized when the molded body 32 is molded. Hereby, generating bubble in the curving portion 323 is prevented.
(3) The main body 410 of the magnetic field sensor 41 is housed in the tubular portion 310 of the housing case 31. The molded body 32 holds the first to third held parts 312 to 314 of the housing case 31. Hereby, the melted resin fails to contact the main body 410 of the magnetic field sensor 41 directly when the molded body 32 is molded, and the detection element 410 is prevented to be damaged by heat of the melted resin. Also, applying a load caused by the flowing of the melted resin to the junction between the central conductor 401a of the first insulated electric wire 401 and the central conductor 402a of the second insulated electric wire 402. And electric disconnection can be prevented.
(4) Since the sheath 400 is held linearly by the cylindrical portion 322 over not less than 10 mm, the resin case 30 is held certainly.

Second Embodiments

Figure 7A:
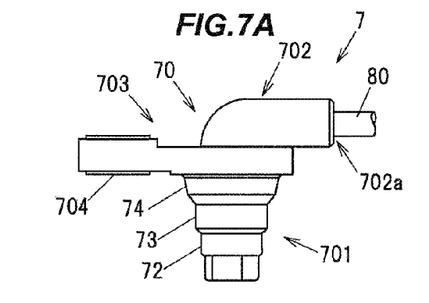
FIG. 7A is a front view showing a sensor module according to a modification in a present embodiment.
Figure 7B:
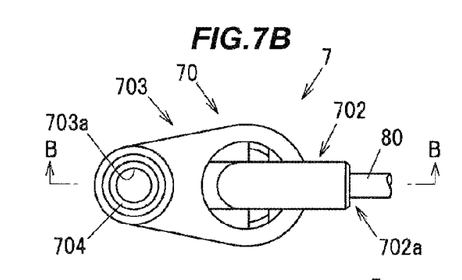
FIG. 7B is a top view showing the sensor module according to the modification in the present embodiment.
Figure 7C:
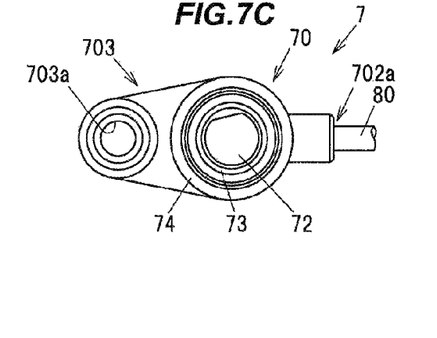
FIG. 7C is a bottom view showing the sensor module according to the modification in the present embodiment.
Figure 7D:
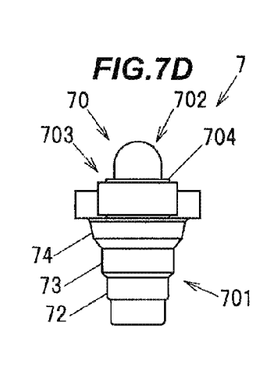
FIG. 7D is a left side view showing the sensor module according to the modification in the present embodiment.
Figure 7E:
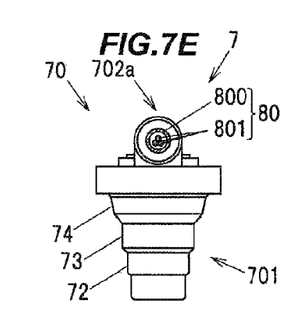
FIG. 7E is a right side view showing the sensor module according to the modification in the present embodiment.
Figure 8:
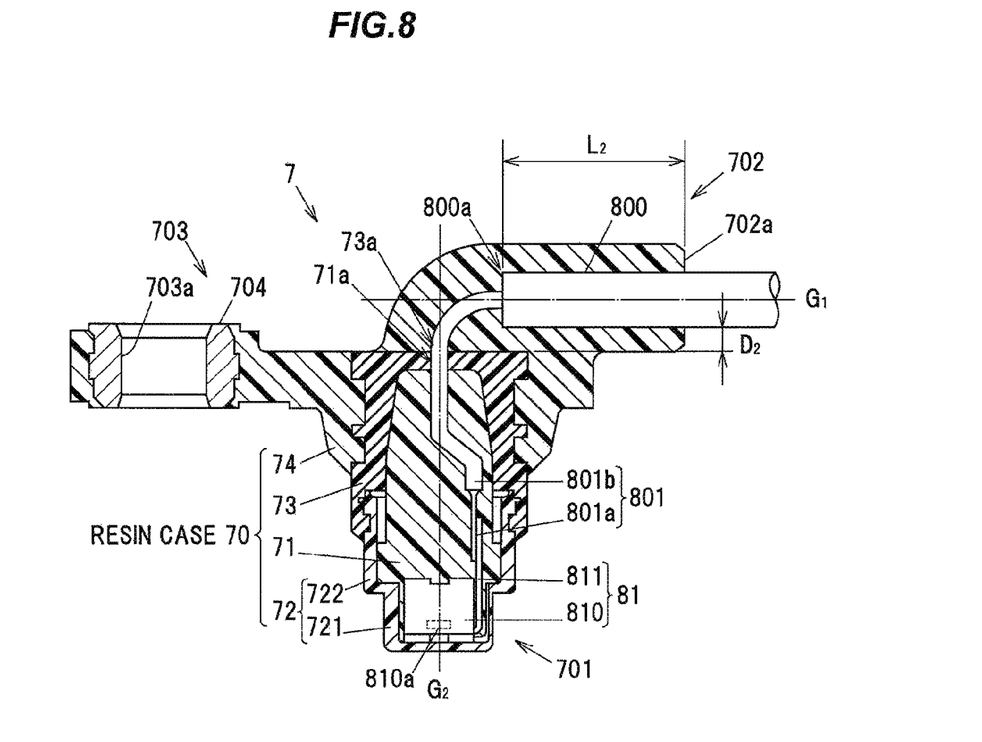
FIG. 8 is a cross sectional view along a line B-B in FIG. 7B.
Figure 9:
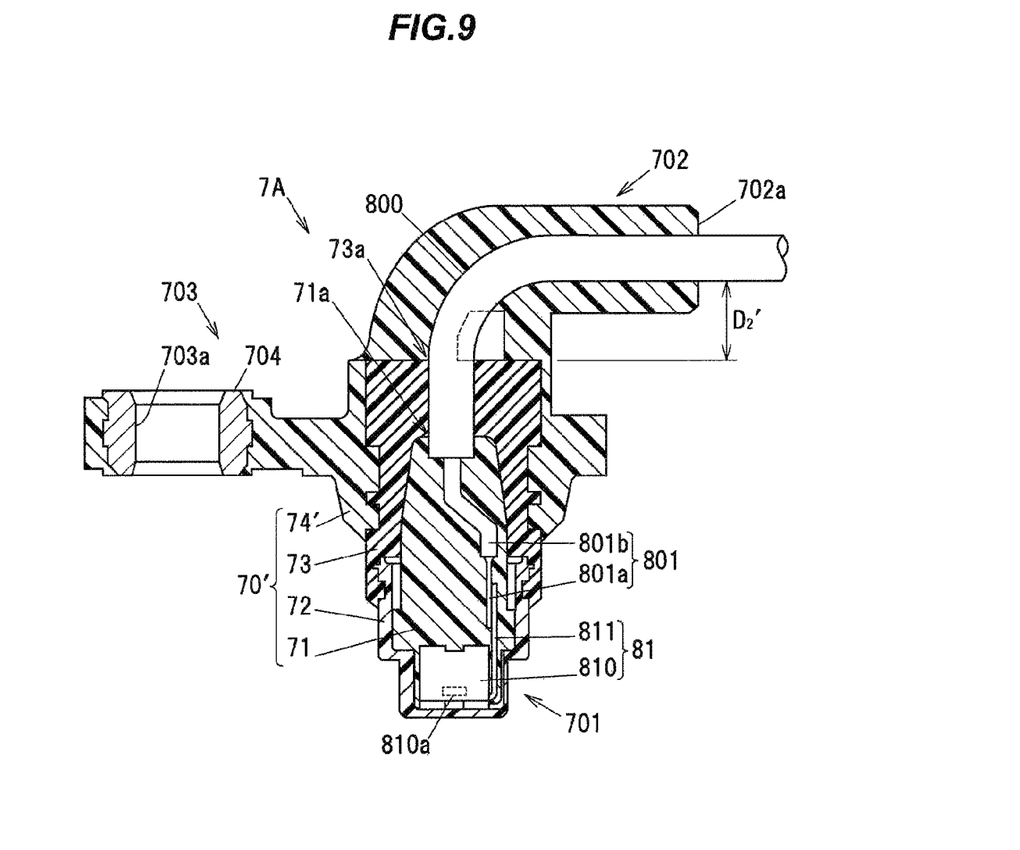
FIG. 9 is a cross sectional view showing a sensor module according to a comparative example 2 in a modification.

Next, the second embodiment will be explained accompanying FIGS. 7A to 7E, 8. FIGS. 7A to 7E shows a rotation detection device 7 according to the second embodiment. FIG. 7A is a front view thereof. FIG. 7B is a top view thereof. FIG. 7C is a cross sectional view thereof. FIG. 7D is a left side view thereof. FIG. 7E is a right side view thereof. FIG. 8 is a cross sectional view along a line B-B in FIG. 7B. Also, FIG. 9 is a cross sectional view showing a sensor module 7A according to a comparative example 2.

The rotation detection device 7 according to the second embodiment is provided with a magnetic field sensor 81, a resin case 70 as a fixing member to house the magnetic field sensor 81, and cable 80 led from the resin case 70. The resin case 70 is provided with an axial main body 701, a cylindrical portion 702 which is formed cylindrically along a leading direction of the cable 80, and a flange 703 which is fixed on the knuckle 9 by a bolt 91. A bolt insert hole 703a to insert the bolt 91 is formed through the flange 703.

As shown in FIG. 7A, the cable 80 is led from an end 702a of the cylindrical portion 702 of the resin case 70. The leading direction of the cable 80 is an orthogonal direction to an axial direction of the main body 701. Also, as shown in FIG. 7E, the cable 80 is provided with a plurality of the (three) insulated electric wires 801 and a tubular sheath 800 which covers the plurality of the insulated electric wires 801 integrally.

As shown in FIG. 8, The resin case 70 of the sensor module 7 is provided with a case member 72, a first molded body 71, a second molded body 73, and a third molded body 74. In the cable 80, the plurality of the insulated electric wires 801 (FIG. 8 shows only the nearest one of the insulated electric wires 80) are exposed from the sheath 800 in the resin case 70. In the insulated electric wire 801, a central conductor 801a is covered by an insulator 801b.

The magnetic field sensor 81 is provided with a sensor main body 810 which includes a detection element 801a, and a plurality of lead wires 811 led from the sensor main body 810 (FIG. 8 shows only the nearest one of the lead wires 811). In FIG. 8, the detection element 810a sealed in the sensor main body 810 is shown by a dash line. The detection element 810a is electrically connected to the plurality of the lead wires 811 in the sensor main body 810.

The first molded body 71 is molded such that includes the magnetic field sensor 81, and an end of the insulated electric wire 801 of which the central conductor 801a is connected to the lead wire 811 of the magnetic field sensor 81. The central conductor 801a is connected to the lead wire 811 by, for example, welding or soldering. The insulated electric wire 801 is fixed along a longitudinal direction of the lead wire 811 in the first molded body 71, and led from a first leading portion 71a of the first molded body 71.

The case member 72 is made of resin which is molded by, for example, mold injection, and is a bottomed tubular member which covers an end at which the magnetic field sensor 81 of the molded body 71 is arranged. Also, the case member 72 is provided with a first cylindrical portion 721 and a second cylindrical portion 722 of which a diameter is formed larger than a diameter of the first cylindrical portion 721 along the axial direction integrally. The first cylindrical portion 721 of the case member 72 is one of the embodiments of "tubular portion" in the present invention.

The second molded body 73 is molded with covering an end of the opening side of the case member 72, and the first molded body 71 which is exposed from the case member 72. Also, the second molded body 73 covers the first leading portion 71a of the first molded body 71, and leads the insulated electric wire 801 which is led from the first leading portion 71a from a second leading portion 73a. Meanwhile, the case member 72 is one of the embodiments of "housing case" in the present invention.

The third molded body 74 is molded with covering an outer surface which includes the second leading portion 73a of the second molded body 73, and configures the cylindrical portion 702 of the resin case 70, and the flange 703 of the resin case 70. The third molded body 74 fixes the insulated electric wire 801 which is exposed from the sheath 800 with the insulated electric wire 801 bending between the sheath 800 and the second leading portion 73a of the second molded body 73. Also, the flange 703 is provided with a tubular collar 704 which is made of metal such as aluminum and molded in the third molded body 74. And a central hole of the collar 704 is the bolt insert hole 703a.

The insulated electric wire 801 is exposed from an end 800a of the sheath 800 which is fixed linearly in the cylindrical portion 702a. A central axis $G_1$ of the sheath 800 which is held by the third molded body 74 of the resin case 70 crosses a central axis $G_2$ of the case member 72 at a predetermined angle by fixing the cable 80 with the insulated electric wire 801 bent in the third molded body 74.

In the present embodiment, each of the central axes $G_1$, $G_2$ crosses perpendicularly each other and the insulated electric wire 801 curves in the arc-circular shape at 90° in the third molded body 74. However, it is not limited to thereof, the central axis $G_1$ of the sheath 800 which is held by the third molded body 74 may crosses the central axis $G_2$ of the first molded body 71 and the case member 72 within 90°±10°. More preferable predetermined angle between the central axes $G_1$, $G_2$ is within 90°±5°.

Outer diameters of the sheath 800 and the insulated electric wire 801 can be set as with the embodiment. That is, for example, radius of curvature of the insulated electric wire 801 which is bent in the third molded body 74 is not less than 3.5 mm and not more than 10 mm. Also, distance $D_2$ from the second leading portion 73a of the second molded body 73 in a longitudinal direction of the lead wire 811 of the magnetic field sensor 81 to an outer peripheral surface of the sheath 800 at the end 702a of the cylindrical portion 702 of the resin case 70 is, for example, not less than 3.5 mm and not more than 10 mm. Also, in the sheath 800, if the axis direction length in the portion which is held by the third molded body 74 defines the length $L_2$, the length $L_2$ is not less than 10 mm.

Comparative Example

FIG. 9 is a cross sectional view showing a sensor module 7A according to a comparative example 2. The sensor module 7A differs in a shape of the third molded body 74' in the resin case 70' from the third molded body 74 of the sensor module 7 according to the modification, and is similar to the configuration of the sensor module 7 except disposing an end of the sheath 800 of the cable 80 in the first molded body 71. In FIG. 9, the same reference numerals assigned in FIG. 7 are assigned to the elements in substantially commons with the sensor module 7 according to the second embodiment and the redundant description thereof is omitted.

In the sensor module 7A, the sheath 800 of the cable 80 bends in an arc-circular shape at 90° with the insulated electric wire 801 in the third molded body 74'. Radius of curvature of the central axis of the sheath 800 in the third molded body 74' is formed larger than the radius of curvature of the central axis of the insulated electric wire 801 in the third molded body 74 of the sensor module 7 according to the second embodiment.

The difference of the radius of curvatures is caused such that the sheath 800 is hard to bend since an outer diameter of the sheath 800 is larger than an outer diameter of the insulated electric wire 801, and the hardness of the sheath 800 is higher than the hardness of the insulated electric wire 801. Hereby, the third molded body 74' of the sensor module 7A becomes larger than the third molded body 74 of the sensor module 7 according to the modification. Also, distance $D_2$' from the second leading portion 73a of the second molded body 73 in the longitudinal direction of the lead wire 811 of the magnetic field sensor 81 to the outer peripheral surface of the sheath 800 in the end 702a of the cylindrical portion 702 of the resin case 70 is more than twice the distance $D_2$ in the sensor module 7 according to the second embodiment. Also, the radius of curvature of the sheath 800 in the third molded body 74' is more than twice the radius of curvature of the insulated electric wire 801 in the third molded body 74 of the sensor module 7 according to the second embodiment.

The second embodiment as described above has the following functions and advantageous effects.

(1) In the cable 80, the central axis $G_1$ of the sheath 800 which is held by the third molded body 74 of the resin case 70 crosses the central axis $G_2$ of the first cylindrical portion 721 of the case member 72 at a predetermined angle by fixing the sheath 800 in the cylindrical portion 702 of the resin case 70 linearly, and bending the insulated electric wire 801 which is exposed from the end 800a of the sheath 800 in the third molded body 74. Hereby, the cable 80 led from the resin case 70 prevents the cable 80 from interfering to the other members mounted on vehicle (such as a braking device), and the resin case 70 can be minimalized (minimalizing size in an axis direction of the main body part 701).

(2) Since the resin case 70 is molded with the magnetic field sensor held in the case member 72, the magnetic field sensor 81 is prevented to be damaged by heat of the melted resin.

SUMMARY OF THE EMBODIMENTS

Next, technical ideas understood from the embodiments as described above will be described below with using the reference numerals, etc., used in the description of the embodiments. However, each reference numeral, etc., described below is not intended to limit the constituent elements in the claims to the members, etc., specifically described in the embodiments.

[1] An in-vehicle detection device (1), comprising:
a cable (40, 80) that comprises a plurality of insulated electric wires (401, 402, 801) that are formed by covering a central conductor (401a, 402a, 801a) with an insulator (401b, 402b, 801b), and a sheath (400, 800) that collectively covers the plurality of the insulated electric wires (401, 402, 801);
a sensor (41, 81) that comprises a sensor main body (410, 810) comprising a detection element (410a, 810a), and a lead wire (411, 412, 811) that is led from the sensor main body (410, 810) and connected to the central conductor (401a, 402a, 801a); and
a fixing member (30, 70) that comprises a tubular portion (310, 721) to house the sensor (41, 81) and fixes the sensor (41, 81) and the cable (40, 80) to each other, wherein the fixing member (30, 70) holds the plurality of insulated electric wires (401, 402, 801) that are exposed from the sheath (400, 800) in a bent state between an end of the sheath (400, 800) and the lead wire (411, 412, 811), and wherein a central axis ($C_1$, $G_1$) of a part of the sheath (400, 800) that is held by the fixing member (30, 70) intersects with a central axis ($C_2$, $G_2$) of the tubular portion (310, 721) at a predetermined angle.

[2] The in-vehicle detection device (1) according to [1], wherein a part (323) of the fixing member (30, 70) that holds the plurality of the insulated electric wires (401, 402, 801) in the bent state is formed curved and cylindrical, and wherein the plurality of insulated electric wires (401, 402, 801) are held at a central portion of the curved and cylindrical part.

[3] The in-vehicle detection device (1) according to [1] or [2], wherein the fixing member (30, 70) comprises a housing case (31, 72) to house the sensor main body (410, 810), and a molded body (32, 71, 73, 74) that is molded with at least a part of the housing case (31, 72) covered thereby, and wherein the plurality of insulated electric wires (401, 402, 801) that are exposed from the sheath (400, 800) are held by the molded body (32, 71, 73, 74).

[4] The in-vehicle detection device (1) according to any one of [1] to [3], wherein the sheath (400, 800) is held linearly by the fixing member (30, 70) in a range of not less than 10 mm in length.

[5] The in-vehicle detection device (1) according to any one of [1] to [4], wherein the detection element (401a, 810a) is a Hall element that detects the magnetic field strength that changes according to a rotation of a wheel.

Although, the embodiments of the invention have been described, the invention is not to be limited to the embodiments. Meanwhile, it should be noted that all combinations of the features described in the embodiments are not necessary to solve the problem of the invention.

Also, the various kinds of modifications can be implemented without departing from the gist of the invention. For example, in the present embodiment described above, although the present invention which is applied to a torque detection device 1 to detect steering torque and the rotation detection device 2 which detects a rotation of the wheel are explained, it is not limited to thereof, the present invention can apply to a detection device which detects each physical quantity and is mounted on the vehicle. In this case, it is not limited to the magnetic field sensor, a sensor such as a temperature sensor, a pressure sensor, or a yaw late sensor can be applied.

Also, when an axial direction of the sheaths 400, 800 in the resin cases 30, 70 crosses a direction parallel to the longitudinal direction of the lead wires 411, 412, 811 of the magnetic field sensors 41, 81, the effect of the present invention can be observed even if the axial direction of the sheaths 400, 800 fails to cross the direction parallel to the longitudinal direction of the lead wires 411, 412, 811 at right angle. For example, the axial direction of the sheaths 400, 800 in the resin cases 30, 70 may incline to the longitudinal direction of the lead wires 411, 412, 811 of the magnetic field sensors 41, 81 at not less than 45° and less than 90°.

REFERENCE SIGNS LIST

2: ROTATION DETECTION DEVICE (IN-VEHICLE DETECTION DEVICE)
3, 7: SENSOR MODULE
30: RESIN CASE
310: TUBULAR PORTION
322: CYLINDRICAL PORTION
323: CURVING PORTION
31: HOUSING CASE
32: MOLDED BODY
40, 80: CABLE
41, 81: MAGNETIC FIELD SENSOR (SENSOR)
400, 800: SHEATH
401: FIRST INSULATED ELECTRIC WIRE
402: SECOND INSULATED ELECTRIC WIRE
401a, 402a, 801a: CENTRAL INDUCTOR
401b, 402b, 801b: INSULATOR
410, 810: SENSOR MAIN BODY
410a, 810a: DETECTION ELEMENT
411: FIRST LEAD WIRE
412: SECOND LEAD WIRE
71: FIRST MOLDED BODY
72: CASE MEMBER
73: SECOND MOLDED BODY
74: THIRD MOLDED BODY
801: INSULATED ELECTRIC WIRE
811: LEAD WIRE

The invention claimed is:

1. An in-vehicle detection device, comprising:
a cable that comprises a plurality of insulated electric wires that are formed by covering a central conductor with an insulator, and a sheath that collectively covers the plurality of insulated electric wires;
a sensor that comprises a sensor main body comprising a detection element, and a lead wire that is led from the sensor main body and connected to the central conductor; and
a fixing member that comprises a tubular portion to house the sensor and fixes the sensor and the cable to each other,
wherein the fixing member holds the plurality of insulated electric wires that are exposed from the sheath in a bent state thereof between an end of the sheath and the lead wire,
wherein a central axis of a part of the sheath that is held by the fixing member intersects with a central axis of the tubular portion at a predetermined angle,
wherein a part of the fixing member that holds the plurality of insulated electric wires in the bent state comprises a curved and cylindrical part, the plurality of insulated electric wires being held at a central portion of the curved and cylindrical part, and the curved and cylindrical part having a circular shape in a vertical cross section, and
wherein the fixing member comprises a housing case to house the sensor main body, and a molded body that is molded with at least a part of the housing case covered thereby, and the plurality of insulated electric wires that are exposed from the sheath are held by the molded body.

2. The in-vehicle detection device according to claim 1, wherein the sheath is held linearly by the fixing member in a range of not less than 10 mm in length.

3. The in-vehicle detection device according to claim 1, wherein the detection element is a Hall element that detects a magnetic field strength that changes according to a rotation of a wheel.

4. The in-vehicle detection device, according to claim 1, wherein the sheath comprises urethane and the molded body comprises poly butylene terephthalate or nylon.

5. The in-vehicle detection device according to claim 1, wherein the molded body comprises nylon 66 or nylon 612.

6. The in-vehicle detection device, according to claim 1, wherein the housing case includes a tubular portion including an opening for facing the sensor main body outwardly, the sensor main body being disposed in a housing apace formed in the tubular portion and seen from outside through the opening.

7. The in-vehicle detection device according to claim 1, wherein the tubular portion comprises an opening and the sensor main body is exposed in the opening.

8. The in-vehicle detection device according to claim 1, wherein the housing case further comprises a guard portion formed between the tubular portion and the molded body, the guard portion having a diameter greater than a diameter of the tubular portion.

9. The in-vehicle detection device according to claim 8, wherein the molded body further comprises an extended portion formed at an end of the curved and circular cylindrical part, and the housing case further comprises a plurality of held parts that are seated in the extended portion of the molded body.

10. The in-vehicle detection device according to claim 9, wherein a diameter of the plurality of held parts is less than a diameter of the guard portion.

11. The in-vehicle detection device according to claim 9, wherein the plurality of insulated wires extend through the guard portion and the plurality of held parts.

12. The in-vehicle detection device according to claim 1, wherein the molded body further comprises a flange for fixing the molded body to a vehicle body.

13. The in-vehicle detection device according to claim 1, wherein the molded body further comprises a straight cylindrical portion, the sheath being inserted into an end of the straight cylindrical portion.

14. A vehicle comprising the in-vehicle detection device according to claim 1.

15. An in-vehicle detection device, comprising:
a cable comprising:
a plurality of insulated electric wires that are formed by covering a central conductor with an insulator; and
a sheath that collectively covers the plurality of insulated electric wires;
a sensor comprising:
a sensor main body comprising a detection element; and
a lead wire that is led from the sensor main body and connected to the central conductor; and
a fixing member that fixes the sensor to the cable, the fixing member comprising:
a housing case comprising a tubular portion for housing the sensor main body, a central axis of the sheath intersecting with a central axis of the tubular portion at a predetermined angle; and
a molded body that is molded with at least a part of the housing case covered thereby, and comprises a curved and circular cylindrical part including a central portion for holding the plurality of insulated electric wires in a bent state between an end of the sheath and the lead wire.

* * * * *